United States Patent [19]

Glover

[11] 4,046,693

[45] Sept. 6, 1977

[54] SCUM SKIMMER APPARATUS

[75] Inventor: Nolan S. Glover, Mineral Wells, Tex.

[73] Assignee: Harsco Corporation, Camp Hill, Pa.

[21] Appl. No.: 608,286

[22] Filed: Aug. 27, 1975

[51] Int. Cl.$^2$ .......... B01D 21/12; C02B 1/36; C02C 1/16; C02C 1/30

[52] U.S. Cl. .......... 210/195 S; 210/242 R; 210/256; 210/525; 210/527

[58] Field of Search .......... 210/195 S, 256, 261, 210/523, 525, 527, 242 R

[56] References Cited

U.S. PATENT DOCUMENTS

| | | | |
|---|---|---|---|
| 2,095,394 | 10/1937 | Morehead | 210/242 R |
| 2,202,772 | 5/1940 | Durdin, Jr. | 210/242 R |
| 2,239,604 | 4/1941 | Harms | 210/195 S |
| 3,303,932 | 2/1967 | Hirs et al. | 210/242 R |
| 3,402,817 | 9/1968 | Dorel | 210/242 R |
| 3,487,017 | 12/1969 | Thorn et al. | 210/525 |
| 3,497,066 | 2/1970 | Nicol | 210/256 |
| 3,498,465 | 3/1970 | Klump et al. | 210/527 |
| 3,563,383 | 4/1969 | Hellquist | 210/242 R |
| 3,764,524 | 10/1973 | Stankewich, Jr. | 210/7 |
| 3,872,005 | 3/1975 | Baker | 210/527 |
| 3,890,289 | 6/1975 | Johnson | 210/523 |

Primary Examiner—Tim R. Miles

Assistant Examiner—Gregory N. Clements

Attorney, Agent, or Firm—Cameron, Kerkam, Sutton, Stowell & Stowell

[57] ABSTRACT

Scum skimmer apparatus having a skimmer blade slideably disposed on support rods extending downwardly from an oscillating bridge which is moveable over the clarifying tank in a biological waste treatment plant. An air tight ballast chamber is secured to the skimmer blade having a source of air communicating with the ballast chamber, the source having a valve for controlling the air flow. As the bridge moves toward the scum trough at one end of the clarifying tank the air is evacuated from the ballast chamber, allowing the blade to engage the surface of the liquid. Upon moving away from the scum trough air is pumped into the ballast chamber providing a buoyancy force which raises the skimmer blade away from the surface. When the opposite end of the clarifying tank is reached the skimmer blade is lowered back to the water by venting the air out of the ballast chamber. A circular treatment tank is provided having spaced concentric walls with partitions therebetween forming alternate aeration and clarifier zones on the periphery thereof with a central digester zone such that separate aeration zones may be used for organic carbon removal and nitrogen removal.

20 Claims, 9 Drawing Figures

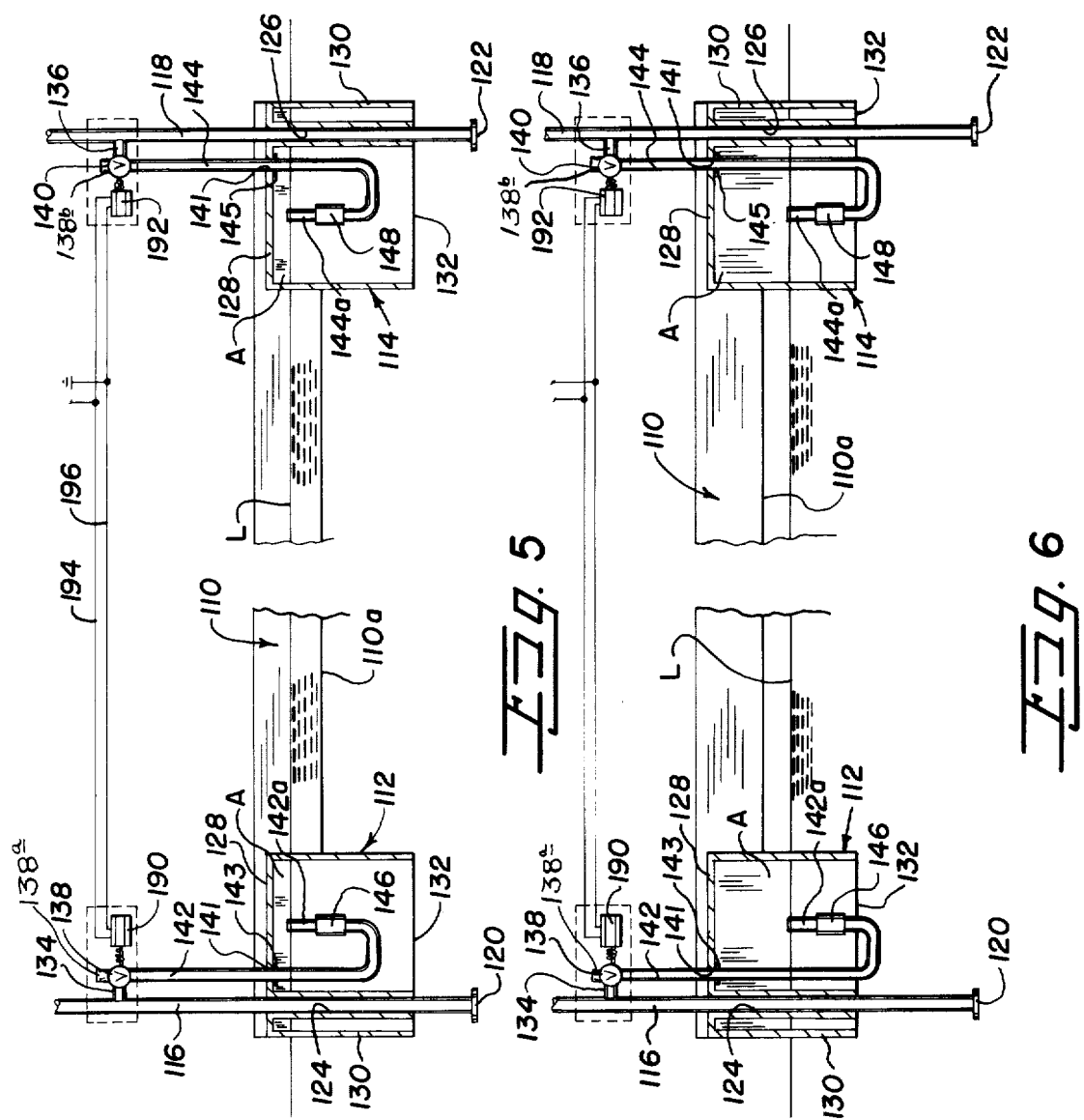

SCUM SKIMMER APPARATUS

BACKGROUND

Biological waste treatment is a process which uses microorganisms to consume dissolved organic contaminants in waste water and convert them to additional microorganisms. In aerobic systems, microorganisms are mixed with waste water containing organics and aerated with oxygen for a predetermined amount of time. After aeration, the mixture of microorganisms and water is transferred to a settling zone or clarifier tank where the solid organic contaminants and microorganisms settle, allowing the water at the upper portion of the clarifier tank to be removed while leaving organics in the clarifier.

Aerobic waste treatment for organic carbon removal utilizes biological actions similar to those found in natural waterways. Treatment plants are designed to speed up natural water purification processes and provides means for treating and disposing of waste products from water. "Sludge" and "scum" is made up of mixed culture of bacteria called *Zoogloes ramigera*. Other microorganisms such as paramecia are also present and are referred to as free swimmers. All these organisms remove organics and some inorganics, by using the materials for food and as essential nutrients.

Microorganisms remove waste water contaminants by absorption and adsorption. Adsorption involves adhering contaminants to the surface of the cells. Material entrapped in this manner is carried by the cell until it is completely digested or disposed of as waste sludge. Absorption involves taking contaminants into the cell. Materials absorbed are completed digested by the microorganisms. In both cases the end products of the process are $CO_2$ and $H_2O$.

Metabolism and energy levels of the biology play an important role in whether or not the cells will coagulate and form large floc particles for good settling characteristics. Performance is based on having enough biological sludge to readily consume the organic pollutants present in the waste water. If biological sludge is in excess, some of it will die and the residue will be discharged in the effluent as part of the TSS. (Total Suspended Solids)

Failure to remove the sludge periodically will result in an anaerobic condition which will sap the oxygen from the effluent and result in a low DO (Dissolved Oxygen) contact and have adverse results in the receiving stream of water. The anaerobic sludge will eventually float to the top of the settling tank where it is referred to as scum and will be carried over into the effluent stream itself. In addition, the contaminated sludge will result in equipment break down in the sewage treatment plant.

If scum is allowed to remain on the clarifier surface, it will dry and form a crust that causes obnoxious odors and may become a harboring place for flies and other insects.

Removal of the floating particles and scum on the surface of the clarifier liquid is usually accomplished by a skimmer which moves the scum into a trough at one end of the tank for removal from the clarifier. Heretofore, skimmers have required large mechanical guiding structure so that the skimmer may be lifted out of the water so that it skims in only a direction toward the scum trough. If the skimmer is moved in both directions in the water, dead areas would form at the ends of the clarifier. The problem with such guide structures is they do not readily adjust for different heights of liquid in the clarifier tank and therefore they remove either too much water, which is undesirable, or not enough scum which makes the system inefficient. Other problems involve the installation of tracks and chains which is expensive and often break down due to the corrosive nature of the liquid in the clarifier.

Heretofore, circular plants have always had the clarifier zone within the center of the tank because the only effective method of skimming the top of the clarifier tank was with a radial skimmer which moved in only one direction in a complete circle. Therefore, it was necessary to build a second clarifier completely outside the perimeter of the circular disposal plant in order to build two complete systems. This meant a dramatic increase in land usage and cost of the plant operation. Heretofore no one has developed an effective skimmer means to skim clarifier zones located on the outside periphery of the circular tank.

My invention is directed toward a skimmer which solves these problems.

SUMMARY OF INVENTION

A scum skimming apparatus having a skimmer blade with a ballast chamber attached to each end thereof. The ballast chambers are slideably disposed on support rods suspended from a bridge structure. Hollow air conduits communicate with a pressurized air supply and with the interior of the ballast chambers. A three-way solenoid valve is provided in the air conduits to control the air supply. To supply air to the ballast chambers, which lifts the skimmer blade out of the liquid for passage away from a scum trough, the valve is moved to a first position to allow air to enter the ballast chambers. The three-way valve may be vented to remove air from the ballast chambers thereby lowering the skimmer blade to the liquid at a point where the liquid is slightly penetrated by the lower edge of the skimmer blade, as the skimmer blade moves toward the scrum trough.

As the bridge moves over the upper portion of the clarifier, the skimmer blade is moved toward the scum trough and is then raised and moved away from the scum trough when it reaches same.

A primary object of the invention is to provide a skimmer blade which is air lifted out of the clarified liquid upon movement away from the scum trough.

Another object of the invention is to provide a skimmer blade which is adjustable in heighth to compensate for the varying heighth of the liquid in the clarifier tank.

A still further object of the invention is to provide a scum skimmer which skims in only one direction to eliminate stagnated areas at the end of the tank.

A further object of the invention is to provide a skimmer blade which is free-floating to eliminate vertical forces upon the support bridge, thus reducing the size of the support structure necessary to carry the skimmer blade.

A further object of the invention is to enable skimming in one direction on circular or arcuate tanks in order to use more than one periphery clarifier tanks in circular tanks.

A further object of the invention is to provide in a sewage treatment system a circular tank having alternate aeration and clarifier zones with a central sludge digester zone providing a circular, compact system for most efficiently removing carbon and nitrogen food from sewage influent.

DESCRIPTION OF THE DRAWING

Drawings of a preferred embodiment of the invention are annexed hereto so that the invention may be better and more fully understood, in which:

FIG. 5 is a partial cross-sectional view taken along line 5—5 of FIG. 1;

FIG. 6 is a cross-sectional view similar to FIG. 5 showing the scum skimmer in a lifted position;

FIG. 9 is an enlarged view of the drive means.

DESCRIPTION OF A PREFERRED EMBODIMENT

Figure 1:
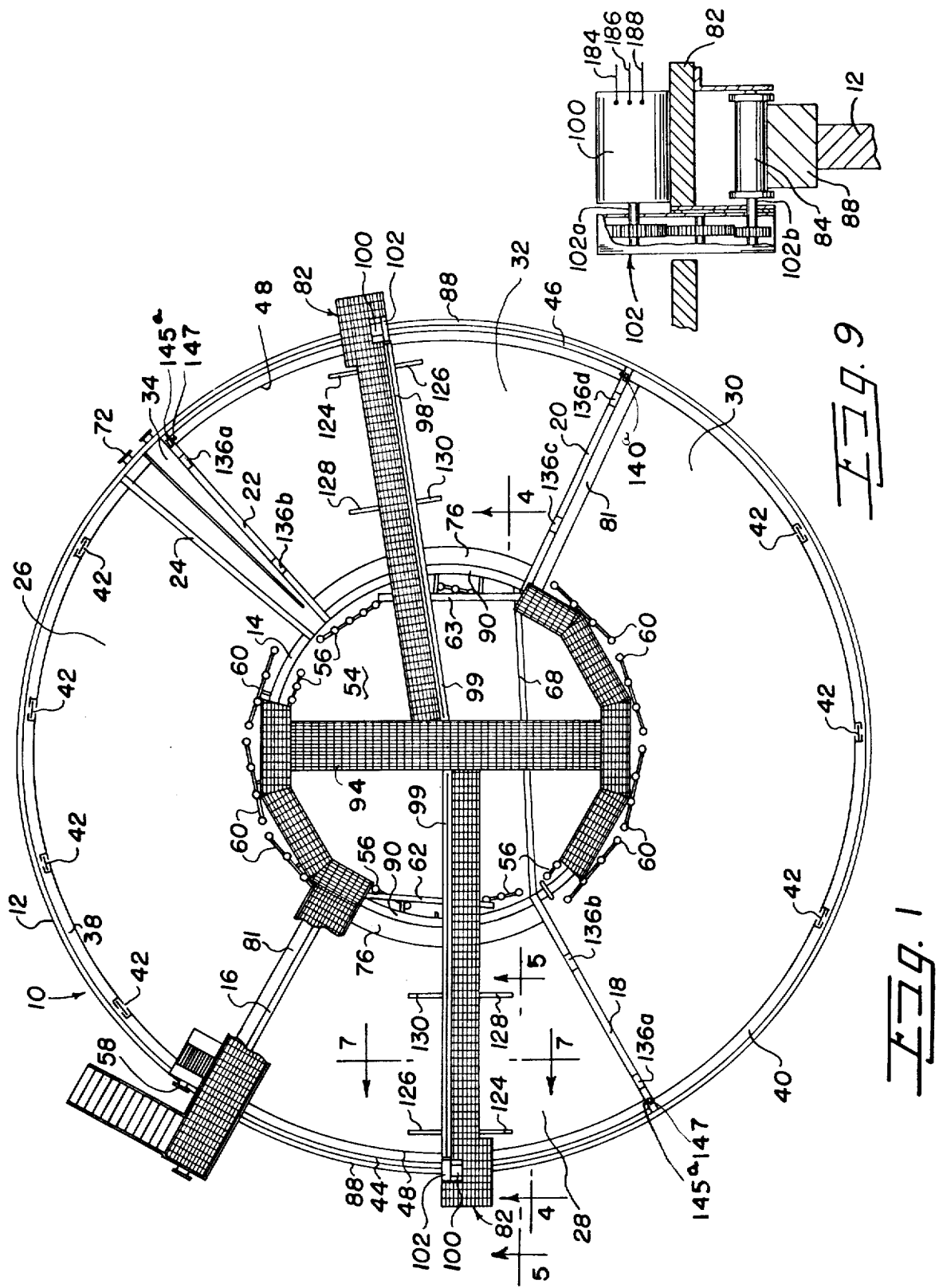
FIG. 1 is a plan view of a biological waste treatment plant.

FIG. 1 illustrates a typical biological waste treatment plant comprising a tank 10 having a first wall 12 and a second wall 14. Partitions 16, 18, 20, 22 and 24 divide the tank 10 into treatment zones comprising a first aeration zone 26, a first clarifier zone 28, a second aeration zone 30, a second clarifier zone 32, and a chlorine contact zone 34. The lower ends 16a, 18a, 20a, 22a, 24a of partitions 16-24 are rigidly secured to bottom 36 to form a water tight tank as shown in FIG. 3.

Figure 3:
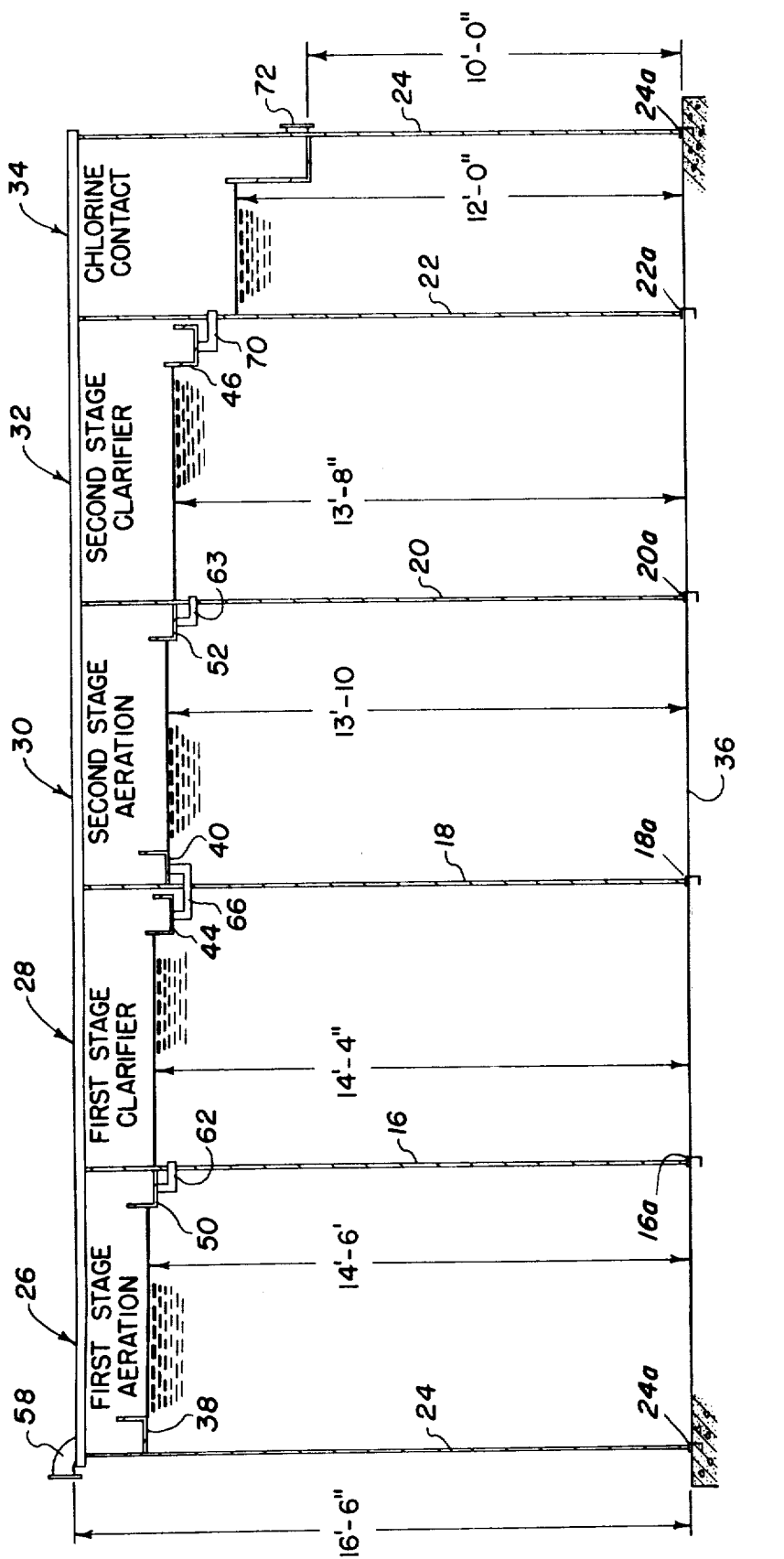
FIG. 3 is a diagrammatic view of the hydraulic profile of the waste treatment plant showing the gravity flow therethrough.

Distribution troughs 38 and 40 are rigidly secured to the upper end 12b of wall 12 in the first and second aeration zones 26 and 30 (FIGS. 1 and 3). Distribution troughs 38 and 40 have adjustable slide gates 42 to permit even distribution of the influent into the first and second aeration zones 26 and 30.

Effluent troughs 44 and 46 (FIGS. 1 and 3) are rigidly secured to the upper end 12b of wall 12 in the first and second clarifiers 28 and 32. As more clearly illustrated in FIG. 4, effluent troughs 44 and 46 have an adjustable weir 48 to control the input of clarified liquid into the effluent troughs 44 and 46.

Collection troughs 50 and 52 (FIGS. 1 and 3) are secured to the upper end 14b of wall 14 in the first and second aeration zones 26 and 30 to collect effluent for distribution into the first and second clarifiers 28 and 32, respectively.

Biological waste treatment is a process by which microorganisms consume dissolved organic contaminants in the waste water and convert them to additional microorganisms. Oxygen is supplied to the microorganisms in the first and second aeration zones 26 and 30 by means of diffusers 60 which meter the oxygen through the liquor. The effluent flows through conduits 62 and 63 to clarifiers 28 and 32 to allow the solid organic contaminants and microorganisms to settle out. Some of the microorganisms and contaminants float to the surface of the liquid in the clarifiers 28 and 32, wherein the microorganisms and organic material are referred to as scum. Skimmer means 80 (FIG. 4) moves across the surface of the liquid to move the floating scum into a scum trough 81 (FIG. 7) to prevent harmful odors and bacteria growth on the surface of the liquid.

Figure 4:
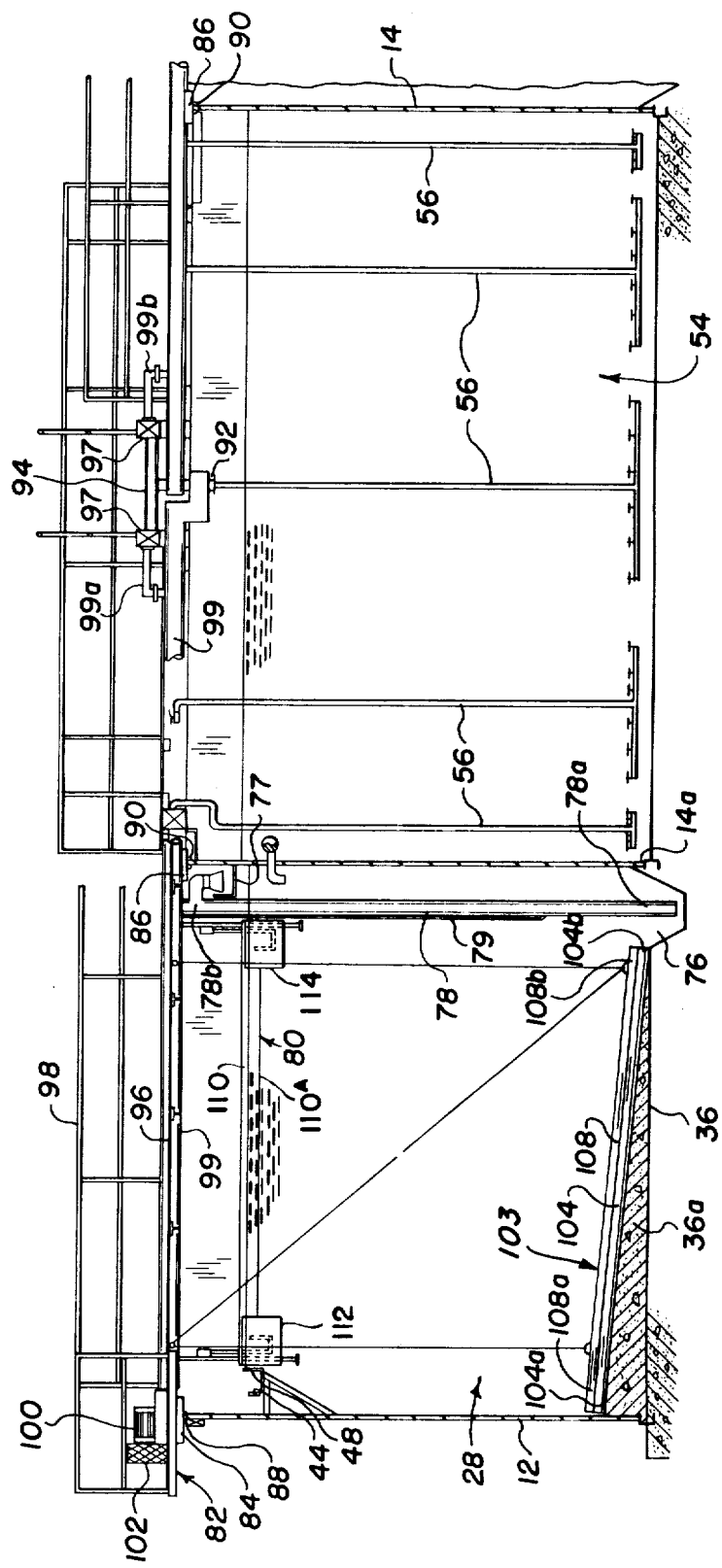
FIG. 4 is a partial cross-sectional view taken along line 4—4 of FIG. 1.

Support means for the sludge scraper 103 and skimmer means 80 comprises oscillating bridges 82 or the like movably disposed over walls 12 and 14. Wheels 84 and 86 are rotatably secured to bridge 82 by means such as an axle (FIG. 9) and rotate on tracks 88 and 90 which are rigidly secured to the upper portions 12b and 14b of walls 12 and 14 (FIG. 4). As illustrated in the preferred embodiment platform 94 is positioned over the aerobic digester 54 across the diameter of same and rigidly secured to wall 14. Bridges 82 are pivotally secured to platform 94 by pivot pin 92 which is rigidly secured to the center of the platform 94 substantially over the center of the aerobic digester 54 in the preferred embodiment. It should be readily apparent that a tank of a different geometric configuration, such as rectangular may not require structure to support a pivot point.

As illustrated in the preferred embodiment the bridges 82 have gratings 96 to form a floor and hand rails 98 provided for convenience of maintenance. An air supply conduit 99 (FIG. 7) is ridigly secured to the side of bridges 82 to provide air to the skimmer means 80. As best illustrated in FIG. 4, air supply conduits 99 are connected to air plenums 97 by flexible conduits 99a and 99b which air plenums 97 communicate with large blowers (not shown) to furnish air to the diffusers 60 and air lift skimmer 110.

As both clarifiers 28 and 32 are substantially identical in structure and operation, only clarifier 28 illustrated in FIG. 4, is described in detail. Drive means (FIGS. 4 and 9) such as motor 100 is secured to the input shaft 102a of transmission 102. The output shaft 102b of transmission 102 is rigidly secured to wheel 84 to move the oscillating bridge 82 from a first position adjacent partition 16 to a second position adjacent partition 18 over the first clarifier 28.

As illustrated in FIGS. 4-6, skimmer means 80 comprises a skimmer blade 110 and two ballast chambers 112 and 114 rigidly secured to skimmer blade 110 such that when injected with air, the ballast chambers 112 and 114 lift the blade 110 completely off of the surface of the liquid. Support rods 116 and 118 are rigidly secured to the oscillating bridge 82 by welding or other means and have flanges 120 and 122 formed on to the lower ends thereof. The support rods 116 and 118 slideably extend through guide sleeves 124 and 126 which are rigidly secured to ballast chambers 112 and 114 as illustrated in the preferred embodiment. The ballast chambers 112 and 114 have tops 128 rigidly secured to sides 130 to form an open ended chamber. Ballast chambers 112 and 114 are open on the bottom end toward the liquid to allow the surface 2 of the liquid to rise therein. However, it should be readily apparent that other configurations may be used to enable flooding of the ballast chambers 112 and 114.

Air conduits 134 and 136 communicate with and are secured to air supply conduit 99 to supply air to the intake side of three-way solenoid actuated valves 138 and 140. The first exhaust sides of valves 138 and 140 are connected to pressure tubes 142 and 144 respectively which communicate with the interior of ballast chambers 112 and 114 respectively. The second exhaust side is vented through tubes 138a and 138b. Pressure tubes 142 and 144 are slideably disposed through passages 141 in ballast chambers 112 and 114 providing pressurized air from the blowers on plenums 97.

Ends 142a and 144a of pressure tubes 142 and 144 are preferably directed toward tops 128 of ballast chambers 112 and 114.

It should be readily apparent that when valves 138 and 140 are opened they allow passage of air from supply tubes 134 and 136 to pressure tubes 142 and 144, ballast chambers 112 and 114 are filled with air, causing the chambers to rise, which raises skimmer blade 110 out of liquid until edges 132 of sides 130 of ballast chambers 112 and 114 are substantially adjacent the surface L of the liquid within the clarifying tank.

When valves 138 and 140 are vented through pipes 138a and 138b, air from the interior of ballast chambers 112 and 114 will flow into pressure tubes 142 and 144 and out valves 138 and 140, causing the skimmer blade 110 to descent toward the surface L of the liquid. Since ends 142a and 144a of pressure tubes 142 and 144 extend just beneath the surface L of the liquid, as the liquid surface L rises within the chambers 112 and 114, the liquid will enter ends 142a and 144a of the pressure tubes 142 and 144, filling the tubes to a constant level, coinciding with the surface L of the liquid in the clarifying tank. This will prevent further expulsion from areas A within the ballast chambers 112 and 114 through the vented valves 138 and 140 and therefore prevent further descending of skimmer blade 110. It should be readily apparent that the bottom edges 110a of skimmer blade 110 would preferably extend a small distance below the surface L of the liquid when fully lowered into the liquid.

As skimmer blade 110 is completely free-floating and slideably disposed upon support rods 116 and 118, the skimmer blade is free to move up and down the rods upon variation of the heighth of surface L of the liquid within the clarifying tank except that flanges 120 and 122 are provided on support rods 116 and 118 to prevent the ballast chambers 112 and 114 and skimmer blade 110 from dropping to the bottom of the clarifier tank if the liquid level in the tank is abnormally low or the tank is drained.

It should be readily apparent that by changing the heighth of ends 142a and 144a of pressure tubes 142 and 144, the distance which the lower edge 110a of skimmer blade 110 extends below the surface L of the liquid may be adjusted. Coupling sleeves 146 and 148 (FIG. 5) are threadedly secured between ends 142 and 144a and pressure tubes 142 and 144 to adjust the heighth of ends 142a and 144a relative to top 128 of ballast chambers 112 and 114. This thereby changes the volume in area A of ballast chambers 112 and 114 and therefore the buoyancy force of the ballast chambers 112 and 114. The buoyancy force is equal to the specific gravity of the liquid displaced times the volume within area A of chamber 112 plus the volume of area A within chamber 114. The distance which edge 110a and skimmer blade 110 penetrates the surface L may be adjusted by changing the volume in the upper portion of chambers 112 and 114 which is done by changing the distance between tops 128 and ends 142a and 144a. The buoyancy force then must equal the weight of ballast chambers 112 and 114 and skimmer blade 110.

It should be readily apparent that other means of controlling the heighth at which surface L of the liquid is allowed to rise within ballast chambes 112 and 114 may be used such as a float valve which would prevent liquid from entering pressure tubes 142 and 144 and the further escape of air therethrough.

Seals 143 and 145 are secured about pressure tubes 142 and 144 adjacent passages 141 in chambers 112 and 114 to prevent air from escaping therefrom.

An alternate embodiment (not shown) which would eliminate support rods 116 and 118, comprises pressure tubes 142 and 144 slideably disposed through guide sleeves 124 and 126. The pressure tubes 142 and 144 would then support the chambers 112 and 114 and communicate air from supply conduit 99 to the interior of the chambers 112 and 114.

Actuating means for solenoids 190 and 192 on valves 138 and 140 comprises a normally opened spring-biased switch 140a secured on partition 16 such that bridge 82 trips plunger 149 to close switch 140a, and a normally closed switch 145a mounted on partition 18 such that bridge 82 trips plunger 147 to open switch 145a. To prevent accidental electric shock a low voltage system is illustrated in the preferred embodiment (but other systems may be employed) wherein transformer 148a is connected to a voltage supply, such as 110 volts AC, and has a secondary coil 150, one side of which is connected to lead 152 which is connected to one contact of normally opened switch 140a. The other contact of normally opened switch 140a is connected to lead 154 which is secured to contact 156 of relay R1 and one side of relay solenoid 168. Lead 170 connects the other side of the relay solenoid 168 to the other side of secondary coil 150 of transformer 148a.

When bridge 82 is adjacent wall 16, plunger 149 is tripped, closing normally opened switch 140a energizing relay solenoid 168. Contacts 156 and 162 are thus closed by blade 172 of relay R1 forming a holding circuit through lead 178 secured to contact 162 and one side of normally closed switch 145a, through the other side of normally closed switch 145a through lead 180 to lead 152. A circuit is made from lead 182 through contact 158 and 164 through blade 174 to lead 184 which is secured to motor 100 to drive the motor in the direction toward partition 18. Motor 100 has a common ground lead 186 secured to a suitable source of current such as 110 volts. When solenoid 168 is energized, the normally closed contacts 160 and 166 are opened.

When bridge 82 reaches partition 18, plunger 147 is tripped, opening normally closed switch 145a which breaks the holding circuit formed through leads 178 and 180, thus de-energizing the solenoid 168. Contacts 158 and 164 are thus opened and motor 100 is energized to move bridge 82 in the direction of partition 18. Blade 176 returns to its normal position across contacts 160 and 166, completing a circuit through lead 188 connected through contact 166 to motor 100 which energizes the motor 100 in the direction to move bridge 82 toward partition 16.

Figure 8:
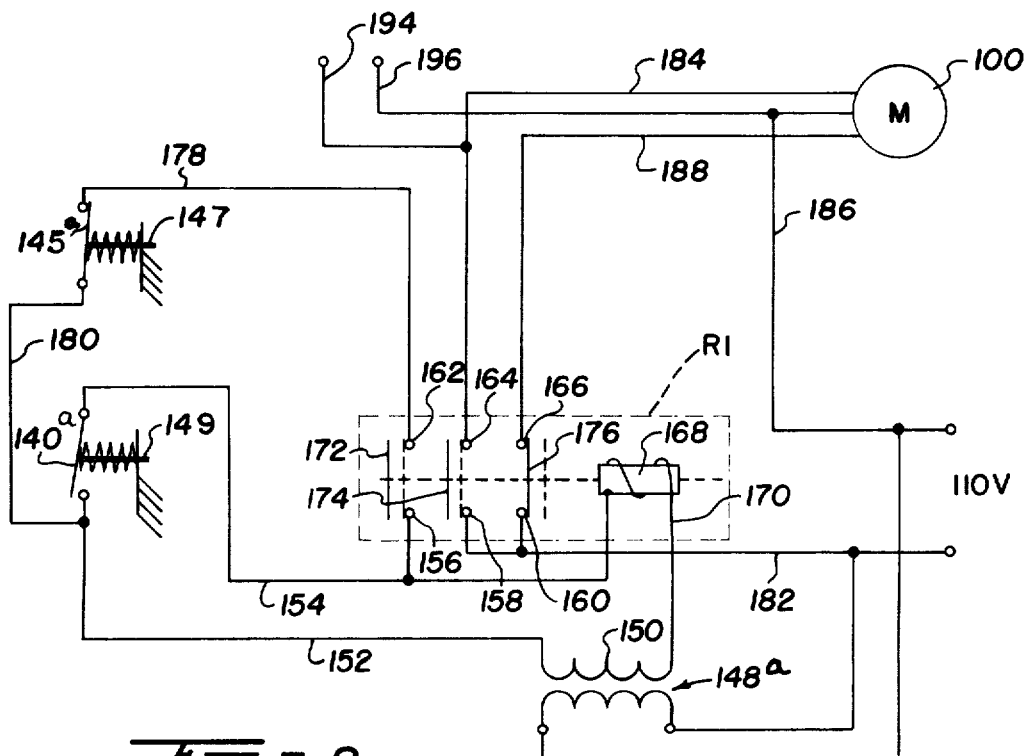
FIG. 8 is a diagrammatic view of the motor actuating means.

When solenoid 168 of relay R1 is energized, current is flowing through line 184. As illustrated in FIG. 8, line 194 is connected to line 184 such that current is flowing through line 194 as the bridge 82 travels in a direction toward partition 18. Solenoids 190 and 192 are energized to move valves 138 and 140 to a first position allowing air from air supply conduits 134 and 136 to communicate with pressure tubes 142 and 144 to pressurize ballast chambers 112 and 114. The air creates a buoyant force to raise the ballast chambers 112 and 144 with skimmer blade 110 out of the liquid to a heighth such that edges 132 of ballast chambers 112 and 114 are substantially aligned with the surface L of the liquid.

When bridge 82 reaches partition 18, opening switch 145a relay R1 is de-energized, and spring biased valves 138 and 140 are moved to a second position by springs (not shown) such that pressure tubes 142 and 144 are vented to the atmosphere, allowing the air within ballast chambers 112 and 114 to escape until the ends 142a and 144a are just beneath the surface L of the liquid.

Figure 7:
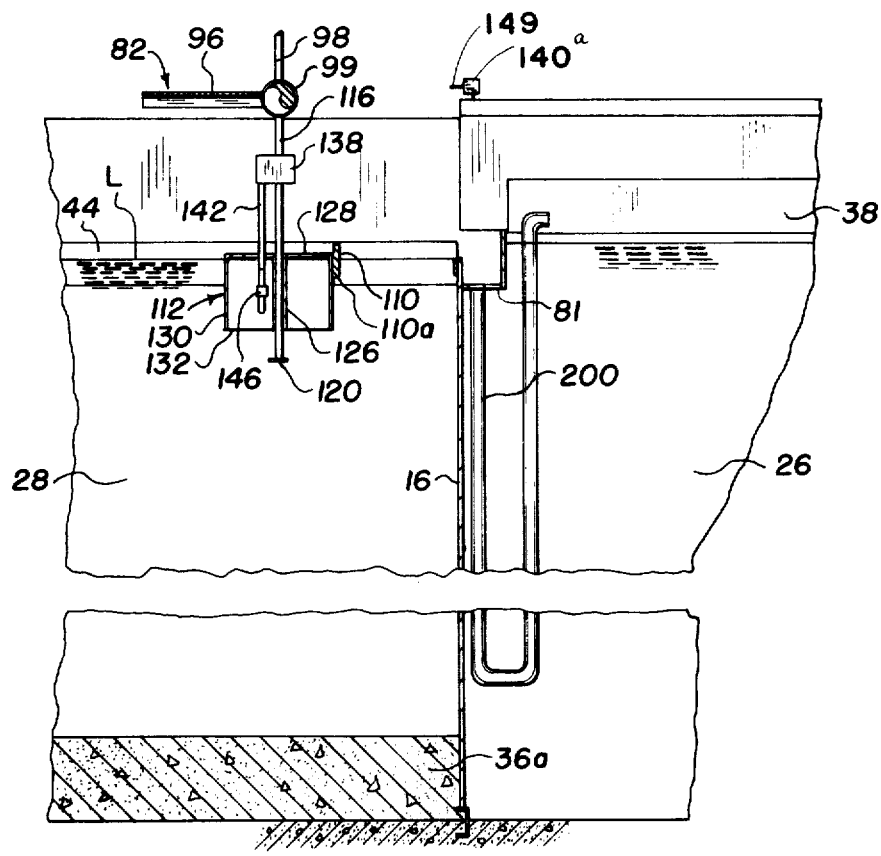
FIG. 7 is a cross-sectional view taken along line 7—7 of FIG. 1.

As skimmer blade 110 moves toward partition 16, the scum ahead of the blade is pushed into the scum trough 81 positioned along partition 16 (FIG. 7). The scum trough 81 collects the scum and directs it into scum removal conduit 200 which communicates with first aeration zone 26. The scum is distributed in aeration zone 26 and is further decomposed by the microorganisms therein.

Operation of the heretofore described device is as follows:

As bridge 82 travels from partition 18 toward partition 16, solenoids 190 and 192 are de-energized placing valves 138 and 140 in the second position with the interior of ballast chambers 112 and 114 vented to atmosphere. This lowers the skimmer blade 110 onto the surface L of the liquid within the clarifying tank so as to push the scum toward the scum trough 81 (FIG. 7). When bridge 82 reaches partition 16, solenoid 168 of relay R1 is energized which energizes solenoids 190 and 192 of valves 138 and 140. Valves 138 and 140 are engaged in a first position when energized wherein air from air supply conduits 134 and 136 communicates with pressure tubes 142 and 144 respectively to fill the ballast chambers 112 and 114. This air lifts the skimmer blade 110 out of the liquid until the bottom edge 132 is substantially aligned with the surface L of the liquid within the clarifier tank. Bridge 82 then moves from partition 16 toward partition 18 whereupon reaching partition 18, solenoid 168 of relay R1 is de-energized, venting the pressure tubes 142 and 144 to lower skimmer blade 110.

It should be readily apparent that by utilizing a sweep in only one direction, dead areas or areas where scum cannot be removed adjacent partition 18 are eliminated.

Although the preferred embodiment illustrated is a circular treatment plant, it should be readily apparent that the skimmer mechanism may be adapted to a rectangular tank wherein the bridge would still travel between the ends of the clarifier and operate substantially the same.

The particular geometry of the tank will determine the relative lengths of the skimmer blade 110 depending upon the particular needs of the treatment plant being used. It is not intended to limit my invention to use in circular treatment plants.

It should be readily apparent that skimmer 110 has a windshield wiper effect in that it skims in one direction which allows formation of a plurality of clarifier zones such as clarifier zones 28 and 32 on the periphery of the tank. This geometric construction will allow sanitation departments to increase their plant capacity in minimum space by utilizing a plurality of clarifier zones within a single tank served by a single central digester zone.

It should also be readily apparent that two separate complete sewage disposal systems may be provided by injecting a second source (not shown) of influent into distribution trough 40 of aeration zone 30 in the preferred embodiment. Connecting pipe 66 would necessarily be changed by disconnecting same from trough 40 and connecting it to flow into chlorine contact zone 34 instead of trough 40 by a connection (not shown). This would provide two complete sewage systems without the use of an outside clarifier. Larger systems may be constructed by merely increasing the area of floor 36 with a minimal increase in materials to construct walls 12 and 14 and a plurality of clarifier zones may be formed creating any number of systems desired in a single tank.

Means to return the sludge to aeration zone 26 comprises an air-lift pump 78 rigidly secured to bridge 82 adjacent wall 14 and over sludge trough 76 such that the pump 78 moves with bridge 82. (FIG. 4). The pump 78 comprises a hollow conduit having a lower end 78a submerged in sludge trough 76 and an upper end 78b arranged to discharge the sludge into the collection trough 77. Air is supplied from air conduit 99 by pipe 79 to air being discharged into the lower end 78a of pump 78. The air moves up the pump 78, drawing sludge and a portion of the water within sludge trough 76 up the pump 78 and discharging it into trough 77. As the bridge 72 moves back and forth the air-lift pump 78 moves with it cleaning the sludge trough 76 as the sludge is delivered from scraper 103.

Figure 2:
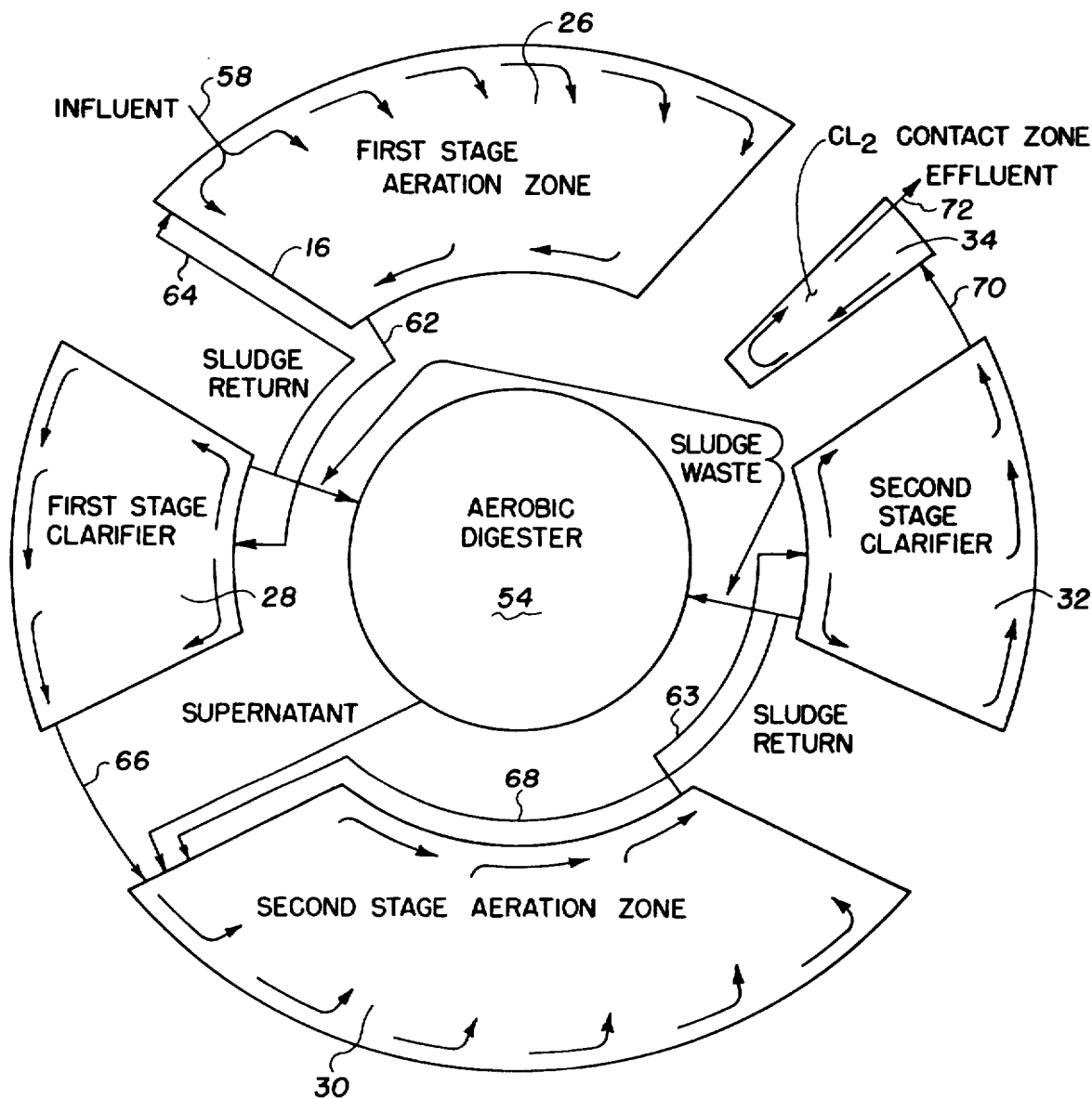
FIG. 2 is a diagrammatic view of the flow of liquid through the biological waste treatment plant.

The flow of the liquor (liquid sewage) is best illustrated by FIGS. 1 and 2 of the drawings. Influent is introduced through inlet conduit 58 which communicates with distribution trough 38. The distribution trough 38 evenly distributes the influent through slide gates 42 into the first aeration zone 26. The waste water is mixed with microorganisms (present in the tank and from returned sludge). Diffusers 60 in the first aeration zone 26 provide oxygen to the microorganisms to sustain their life.

The combined sludge and water (mixed liquor) flows into the collection trough 50 of the first aeration zone 26 and flows through conduit 62 into the first clarifier 28. In clarifier 28 the mixed liquor is allowed to settle, separating the sludge from the liquid for return to the first aeration zone 26 by means of conduit 64.

Sludge is separated from the water by gravity in clarifier 26. The clear water flows over baffle 48 (FIGS. 1 and 4) into effluent trough 44, through conduit 66, into distribution trough 40, and out slide gates 42 into aeration zone 30. The mixed liquor is further aerated by diffusers 60 which supply oxygen to the microorganisms to further their growth.

The mixed liquor then flows into the collection trough 52, through conduit 63, and into the second clarifier 32. Again the remaining sludge settles from the mixed liquor by gravity to the bottom 36a of the second clarifier tank 32. Sludge is directed back into the second aeration zone 30 through a conduit 68 and water is collected in the effluent through 46. Effluent from trough 46 flows into chlorine contact zone 34 through conduit 70. Water within contact zone 34 is permiated by the chlorine metered into the chlorine contact zone 34 to disinfect the water prior to discharge through effluent connection 72.

Such circular tank construction also permits the provision of alternate aeration and clarifier compartments spaced about the tank with a central sludge digester so that the influent may be passed through the series of treatment zones by a gravity flow. This allows influent to be passed into a first aeration zone whereby microorganisms absorb and absorb contaminants in the liquid influent producing end products of carbon dioxide and water. Aeration zone 26 is permeated with oxygen supplied through diffusers 60 to support the organic carbon removing microorganisms. Liquid influent is passed into settling tank 28 where the sludge is allowed to settle out. Clear liquid influent is then allowed to flow into aeration zone 30 where an ammonia treatment occurs, called nitrification, which involves a group of microorganisms which are "autotrophic", meaning that the microorganisms make their own food. The autotrophic bacteria utilizes inorganic carbon, i.e. carbon dioxide, for energy and at the same time metabolize ammonia to nitraite. The nitrification involves the general reaction of $2NH_3 + 4O_2 \rightarrow 2H^+ + 2NO_3^- + 2H_2O$. The reaction is catalyzed by two species of bacteria, the Nitrosomonas and the Nitrobacter. These bacteria require low organic carbon concentrations and high dissolved oxygen levels to bring about the nitrification reaction. Therefore oxygen is permeated through the liquid influent by diffuser 60. This liquid influent is passed to settling zone 32 whereby the sludge is settled out and returned to zone 30 or wasted in the aerobic digester 54. Liquor passing from zone 32 is free from all contaminants and is treated with the chlorine in chlorine treatment zone 34 and passed to a stream or a series of filters.

It should be readily apparent that by utilizing such a process the ammonia in the sewage treatment may be removed from the waste water by compensating for the slower growth of the nitrogen removing bacteria due to their sensitivity to temperature and toxic elements. As the temperature of the liquor is lowered in cooler climates the nitrogen producing bacteria tend to slow down. The microorganisms which remove organic carbon are less sensitive to the temperature drop and begin to multiply at a higher rate than the nitrogen removing bacteria, and deplete the liquor of oxygen which is needed for the nitrogen removing bacteria and the nitrogen removing bacteria begin to die. Therefore, it is desirable to protect the nitrogen removing bacteria by providing a separate aeration zone where the bacteria can survive separate from the carbon removing bacteria and will efficiently remove the nitrogen from the waste water.

It should be readily apparent that the design configuration of the circular tank disclosed herein, with the two clarifiers and two aeration zones is particularly adaptable to the nitrification removing process.

From the foregoing it should be readily apparent that the embodiment hereinbefore described accomplishes the objects of the invention hereinbefore discussed.

It should be appreciated that other and further embodiments of the invention may be devised without departing from the basic concept thereof.

Having described my invention, I claim:

1. In a clarifier tank for removing microorganisms and waste from liquid influent: a tank having first and second ends joined by side walls; a bridge; means moveably mounting the bridge over the tank; drive means to move said bridge from a position adjacent the first end of the tank to a second position adjacent the second end of the tank; means to alternately reverse the direction of movement of the bridge between the first and second ends of the tank; a skimmer blade; a ballast chamber having an open lower end submersible below the level of liquid in the tank; means for rigidly securing the ballast chamber to the skimmer blade; means for slideably attaching the ballast chamber to the bridge for movement in a vertical direction such that the ballast chamber and skimmer blade move in a horizontal direction with the bridge but are free to move in a vertical direction relative to the bridge to move the skimmer blade out of contact with the liquid; air supply means communicating with the interior of the ballast chamber above the liquid level therein; a valve to control the flow of air into and out of the ballast chamber such that air may be injected under pressure into the ballast chamber to raise the ballast chamber upwardly in the liquid, and air may be vented from the ballast chamber through the valve to lower the ballast chamber into the liquid; actuating means adjacent the first end to control the valve means to move the valve to a position to admit air under pressure into the chamber; and actuating means adjacent the second end of the tank to move the valve to a position to exhaust air from the chamber.

2. The combination called for in claim 1 wherein the means slideably securing the ballast chamber to the bridge comprises a support rod rigidly secured to the bridge and extending downwardly through the ballast chamber; and guide means rigidly secured to the ballast chamber adapted to slideably receive the support rod.

3. The combination called for in claim 2 with the addition of means on the rod engageable with the guide means to limit downward movement of the ballast chamber relative to the rod.

4. The combination called for in claim 1 wherein the air supply means comprises a conduit, said conduit having an end directed toward the upper portion of the ballast chamber in position to extend above the level of liquid in the chamber.

5. The combination called for in claim 4 with the addition of a threaded collar on the end of the conduit such that the distance between the level of liquid in the ballast chamber and upper end of the ballast chamber may be adjusted by turning the collar.

6. The combination called for in claim 1 wherein the bridge is mounted on rollers rollable along the side walls, and the drive means comprises a reversible motor drivingly connected to a roller at one end of the bridge.

7. In a device for moving scum from the surface of liquid in a clarifier tank having first and second spaced end walls, joined by spaced side walls; liquid in said tank; a bridge moveably mounted on the side walls; reversible drive means for moving the bridge between the end walls; means to alternately reverse the drive means as the bridge reaches the end walls; at least one ballast chamber; means slideably suspending the ballast chamber to the bridge; said chamber being open at the lower end and extending below the level of liquid in said tank; conduit means communicating with the chamber to supply air under pressure to the area of the chamber above the level of the liquid and to exhaust air therefrom to change the buoyancy thereof; valve means in said conduit to control the flow of air under pressure through the conduit to said area, and to control the exhaust of air through said conduit from said area; means to selectively actuate the valve means adjacent each end wall to direct flow of air into and out of said area; whereby the ballast chamber is alternately raised and lowered; and a skimmer blade secured to the ballast chamber in position to contact the surface of the liquid when the ballast chamber in position to contact the surface of the liquid when the ballast chamber is in lowered position and to clear the surface of the liquid when the ballast chamber is in raised position.

8. The combination called for in claim 7 wherein the reversible drive means comprises: a reversible electric motor having a shaft; a transmission connected to said shaft; a wheel; means for rotatably attaching the wheel to said bridge at one end thereof; a track rigidly secured to the upper portion of one of the side walls whereby the wheel is guided by said track at one end of the bridge; means securing said wheel to said transmission such that rotation of the electric motor shaft will rotate the wheel along said track to move said bridge; and means to moveably support the other end of said bridge.

9. The combination called for in claim 8 wherein the means to moveably support the other end of the bridge comprises: a track on the upper portion of the said other side wall and a wheel on the bridge rollable along the said other side wall.

10. The combination called for in claim 7 wherein the means to alternately reverse the drive means comprises an electric motor; a first set of contacts and a second set of contacts; an electrical power supply connected to the motor; a relay moveable between the first set of contacts and the second set of contacts; means connecting the first set of contacts on said relay to said motor to cause the motor to rotate in one direction; means connecting the second set of contacts of said relay to said motor to cause the motor to rotate in the reverse direction; a switch secured to the first end wall to move said relay into contact with the first set of contacts; and a second switch secured to second end wall to move said relay into contact with the second set of contacts.

11. The combination called for in claim 7 wherein the means slideably suspending the ballast chamber to the bridge comprises a support rod rigidly secured to said bridge and extending downwardly through the ballast chamber; and a guide means rigidly secured to said ballast chamber adapted to slideably receive said support rod.

12. The combination called for in claim 7 wherein the conduit means comprises a conduit having an end directed toward the upper portion of the ballast chamber to extend above the level of the liquid in the chamber.

13. The combination called for in claim 12 with the addition of a threaded collar on the end of the conduit such that the distance between the level of the liquid in the ballast chamber and the upper end of the ballast chamber may be adjusted by turning the collar.

14. The combination called for in claim 7 wherein the conduit means has a first end connected to a pressurized air supply and a second end connected to said valve means.

15. The combination called for in claim 7 wherein said means to selectively activate the valve means comprises: electrically responsive switching means adapted to move said valve means to a first position to admit air under pressure to said chamber upon receiving a first signal, and adapted to move the valve to a second position upon receiving a second signal; a first switch means secured adjacent said first end wall adapted to send a first signal to said electrically responsive switching means when engaged by said bridge; a second switching means secured adjacent said second end wall adapted to send a second signal to said electrically responsive switching means upon being engaged by said bridge; and means to connect said first and second switching means to said electrically responsive switching means.

16. A clarifier tank having a first and second end walls, said clarifier tank being adapted to contain liquid; a support bridge moveable between the end walls; drive means to move the support bridge back and forth between the end walls; a skimmer blade; means moveably securing said skimmer blade to said support bridge such that the skimmer blade is moveable vertically relative to the support bridge; a buoyant member secured to the skimmer blade, said buoyant member being biased by air; and means to control the buoyancy of the buoyant member to raise the skimmer blade out of contact with the surface of the liquid in the tank adjacent the first end wall as the skimmer blade is moved in one direction by the support bridge and to lower the skimmer blade into contact with the surface of the liquid in the tank adjacent the second end wall as the skimmer blade is moved in the other direction by the support bridge.

17. The combination called for in claim 16 wherein the buoyant member comprises a chamber secured to the blade, said chamber having an open lower end immersed below the level of the liquid; and means slideably attaching the chamber to the bridge.

18. The combination called for in claim 16 wherein the drive means to move the bridge back and forth between the end walls comprises a reversible electric motor carried by the bridge; a roller driven by the motor in contact with one side wall; switch means adjacent each end wall to reverse said motor; and guide means on the bridge moveably engageable with the other side wall.

19. The combination called for in claim 16 wherein the means to control the buoyancy of the buoyant member comprises: an air supply conduit; valve means controlling flow of air under pressure through the conduit into the buoyant member; air vent means to exhaust air from the buoyant member; means to actuate the valve means adjacent one end wall; and means to actuate the air vent means adjacent the other end wall.

20. The combination called for in claim 16 wherein the clarifier tank comprises: an outer circular wall; an inner circular wall concentric with the said outer circular wall, said first and second end walls being spaced between the inner and outer circular walls to form a compartment along the periphery of said tank; means pivotally securing a first end of said support bridge over the center of said tank; and means moveably securing a second end of said support bridge over the outer circular wall such that the bridge extends radially outwardly from the center of the tank and moves over said compartment.

* * * * *